E. LUNKENHEIMER.
THROTTLE VALVE.
No. 10,557. Reissued Feb. 3, 1885.
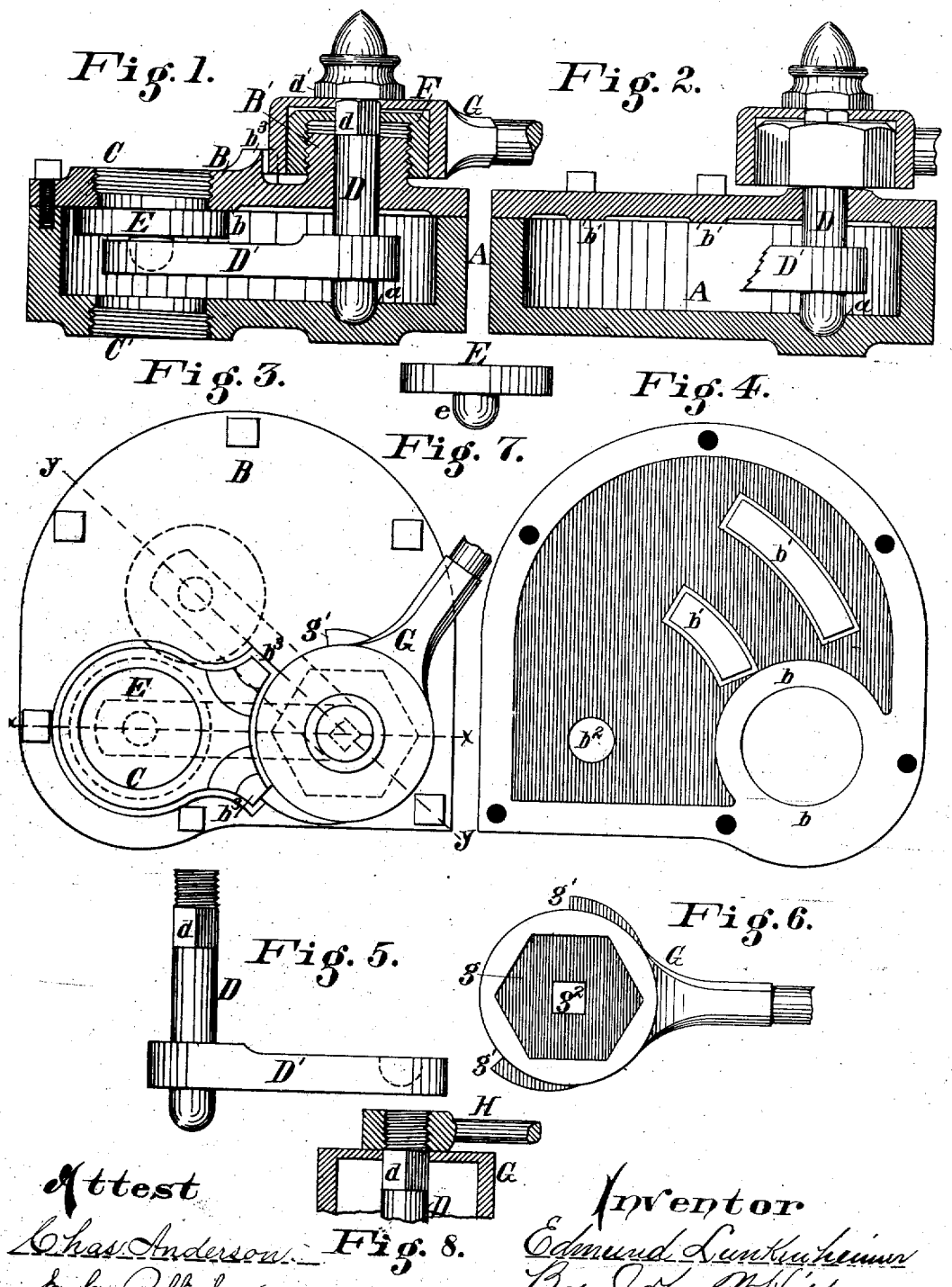
Attest
Chas. Anderson.
S. L. Pollock.
Inventor
Edmund Lunkenheimer
By John W. Hill
Attorney

UNITED STATES PATENT OFFICE.

EDMUND LUNKENHEIMER, OF CINCINNATI, OHIO.

THROTTLE-VALVE.

SPECIFICATION forming part of Reissued Letters Patent No. 10,557, dated February 3, 1885.

Original No. 301,823, dated July 8, 1884. Application for reissue filed November 11, 1884.

*To all whom it may concern:*

Be it known that I, EDMUND LUNKENHEIMER, of Cincinnati, in the county of Hamilton and State of Ohio, have invented certain new and useful Improvements in Throttle-Valves, of which the following is a specification.

This invention relates to improvements in steam and other stop-valves actuated by hand-levers, more especially that kind of valves which are used for controlling the admission of steam to engines and are known as "throttle-valves."

The invention consists in the combination of devices hereinafter described and claimed.

In the accompanying drawings, Figure 1 is a sectional elevation on line $x$ $x$ of Fig. 3. ~~Fig. 2 is a sectional elevation~~ of valve-case on line $y$ $y$ of Fig. 3. Fig. 3 is a plan of my improved valve. Fig. 4 is a plan of under side of cap or bonnet of case. Fig. 5 is a detached elevation of valve-stem. Fig. 6 is a plan view of wrench end of lever or handle. Fig. 7 is a detail of valve-disk, and Fig. 8 is a detail of locking-lever.

Similar letters of reference indicate similar parts.

A is the valve-case, provided with a cap or bonnet, B, secured thereto by bolts or screws in the usual manner.

C C′ are threaded apertures for the connection of the usual steam-pipes.

D is the valve-stem, provided with the radial arm D′, and a squared shank, $d$, which latter fits a corresponding opening in the wrench end of lever. The inner end of stem D is rounded off or otherwise formed to fit the step-bearing $a$ of case A, and the outer end is threaded to receive the cap-nut $d'$. The stem D is supported in position partly by the bearing in the neck B′ and partly by the step-bearing $a$.

E is a disk-valve of composition or any suitable material, provided with a pintle, $e$, (shown in elevation, Fig. 7, and by dotted lines of Fig. 1,) which fits a corresponding recess or cup-bearing in the upper face of arm D′. The face of disk E is ground or otherwise brought to a true surface, and the seat $b$, on under side of bonnet B, is similarly finished, so that when disk E is firmly pressed against seat $b$ a steam-tight joint is made, and no leak or transfer of steam or other fluid from one side of the valve to the other can take place. $b'$ $b'$ are curved ways on the under side of bonnet B, concentric with orifice $b^2$. By reference to Figs. 2 and 4 it will be seen that the ways $b'$ $b'$ are sufficiently relieved to permit steam to pass behind or above the disk E when the latter is swung around from its seat by the oscillation of stem D and arm D′.

By reference to Figs. 1 and 2 it will be observed that the valve-seat $b$ and the concentric ways $b'$ $b'$, as well as the surface forming the steam-joint between the valve-case A and bonnet B, are in a plane, whereby said surfaces are adapted to be finished in a planer or lathe at one operation.

B′ is a neck preferably cast on the bonnet B and threaded, as shown in Fig. 1, to receive the screw-gland F, which gland and neck form a stuffing-box to pack the stem D, in the usual manner of packing stems in ordinary steam and other stop-valves. The gland F is of hexagon form outside, and fitted to receive the box-wrench or hexagon recess $g$ in the end of hand-lever G. The hand-lever G is provided with cheeks $g'$ $g'$, which, in conjunction with the stops $b^3$ $b^3$, formed on cap B, limit the oscillation of the lever, and consequently of arm D′ and valve-disk E. The squared shank $d$ of stem D fits the square opening $g^2$ of hand-lever G, and the oscillation of the lever between the stops $b^3$ $b^3$ necessarily produces an oscillation of the stem D and its arm D′, and consequently an opening or closing movement of valve-disk E upon its seat $b$; but the screw-gland F fitting the hexagon recess $g$ of hand-lever G, it is a consequence that as the lever is oscillated the gland is also turned on the threaded neck B′ in such a direction that when the disk E is swung off its seat on the ways $b'$ to open the valve the gland F is screwed down, and when the disk E is swung off the ways $b'$ to its seat $b$ to close the valve the gland F is screwed up. The cap-nut $d'$ being screwed firmly down upon the back of lever G, it follows that when the valve-disk E is swung off its seat and the gland F screwed down the disk E is automatically eased off its seat, and when the disk is swung in a contrary direction and the gland screwed up the disk E is automatically forced tightly up against the seat $b$. The pitch of thread upon the neck B′ is sufficiently fine to prevent a sticking of the disk E upon the seat in closing the valve, and the necessarily limited motion of lever G and gland F, with a fair depth of gland and neck, prevents perceptible wear of the threads by the oscillation of the gland.

The stem D and arm D′ may be of a single forging or casting, as shown; or the arm D′ may be a separate member and keyed, pinned, or otherwise secured to the stem. The cheeks $g'$ $g'$ of the lever G, in conjunction with the stops $b^3$ $b^3$ of cap B, limit the motion of lever and prevent any overstrain or injury of the wearing parts of the valve.

The stuffing-box formed by neck B′ and gland F may be furnished with a loose ferrule to compress the packing, after the manner of constructing the stuffing-boxes of common stop-valves.

H is a locking-lever which is tapped to fit the threaded end of stem D, and displaces the cap-nut $d'$ when the valve is to be set in any desired position and securely retained there against jars or concussions, as in throttle-valves for portable and traction farm-engines. When the locking-lever is used, the valve-disk E is swung off seat $b$, in the manner described, to any desired position, and the lever H, being firmly screwed down against back of hand-lever G, forces the valve-disk E hard up against seat $b$ and ways $b'$, and secures the disk in this position against possible accidental displacement.

One special advantage of my construction is the facility with which old or worn valves may be refitted by removing the bonnet B and valve-disk E, and planing, filing, scraping, or otherwise restoring true surfaces to the wearing-face of valve-disk and seat $b$ and ways $b'$ $b'$. This can quickly be accomplished by an ordinary mechanic with the simplest tools.

I am aware that gate and plug valves actuated by hand-levers are not new, and I do not claim as my invention the simple operation of a stop-valve by a hand-lever.

Having described my invention, what I claim is—

1. The combination of an oscillating arm, as D′, stem D, and hand-lever G, with the disk-valve E, and screw-gland F, whereby said valve-disk by the oscillation of the moving parts is automatically relieved from and forced against the seat $b$, in the manner substantially as described.

2. The combination of a valve-case having a seat, $b$, a stem, D, journaled to rotate therein, an arm, D′, extending from the stem to swing when the latter is rotated, a valve-disk, E, on the arm, a swinging hand-lever, G, connected with the stem to rotate the latter, and a locking-lever, H, secured to the stem to bind against the hand and lock the stem, when rotated to the position desired, substantially as described.

3. The combination of the oscillating valve-disk E, seat $b$, and concentric ways $b'$ $b'$, whereby the said valve-disk is pressed upon both sides by steam when off its seat, in the manner and for the purpose substantially as specified.

4. In a throttle-valve containing an oscillating stem turning in suitable bearings, and provided with a radial arm, which arm supports a disk-valve, and in which the opening and closing movements of said disk-valve are caused by an oscillating movement imparted to said stem and arm, a bonnet in which said oscillating stem is journaled, and of which bonnet the valve-seat and concentric ways over which said disk-valve travels in its opening and closing movements are in a plane, substantially as described.

In testimony whereof I have signed my name to the foregoing specification in the presence of two subscribing witnesses.

EDMUND LUNKENHEIMER.

Witnesses:

CHAS. ANDERSON,

R. M. CHRISTOPHER.